United States Patent
Huot-Marchand et al.

(10) Patent No.: US 6,190,217 B1
(45) Date of Patent: Feb. 20, 2001

(54) APPARATUS FOR REDUCING VIBRATION ON A SHIP

(75) Inventors: Jean-Paul Huot-Marchand, Evette Salbert; Jean-Philippe Nicod, Belfort, both of (FR)

(73) Assignee: Alstom Entreprise SA, Levallois Perret (FR)

( * ) Notice: Under 35 U.S.C. 154(b), the term of this patent shall be extended for 0 days.

(21) Appl. No.: 09/292,338

(22) Filed: Apr. 15, 1999

(30) Foreign Application Priority Data

Apr. 16, 1998 (FR) .................................................. 98 04752

(51) Int. Cl.$^7$ .................................................. B63H 21/21
(52) U.S. Cl. .................................................. 440/52; 440/1
(58) Field of Search .................................. 440/52, 83, 1; 464/180

(56) References Cited

U.S. PATENT DOCUMENTS 5,049,795  9/1991  Moulds, III .
5,148,402 * 9/1992 Magliozzi et al. .................. 364/574
5,355,732  10/1994  Anderl et al. .

* cited by examiner

*Primary Examiner*—Sherman Basinger
(74) *Attorney, Agent, or Firm*—Sughrue, Mion, Zinn, Macpeak & Seas, PLLC

(57) ABSTRACT

An apparatus for reducing vibration on a ship with at least two drive shafts by determining and utilizing an optimum angular offset which corresponds to a minimum vibration level. The apparatus comprises a servo-control circuit for servo-controlling the angular difference between the two shafts to a reference value. A calibration circuit determines the optimum angular offset between the shafts corresponding to the minimum vibration level. A control circuit responds to a control signal by actuating in succession the calibration circuit and then the servo-control circuit, wherein the optimum angular offset is set to the reference value.

14 Claims, 1 Drawing Sheet

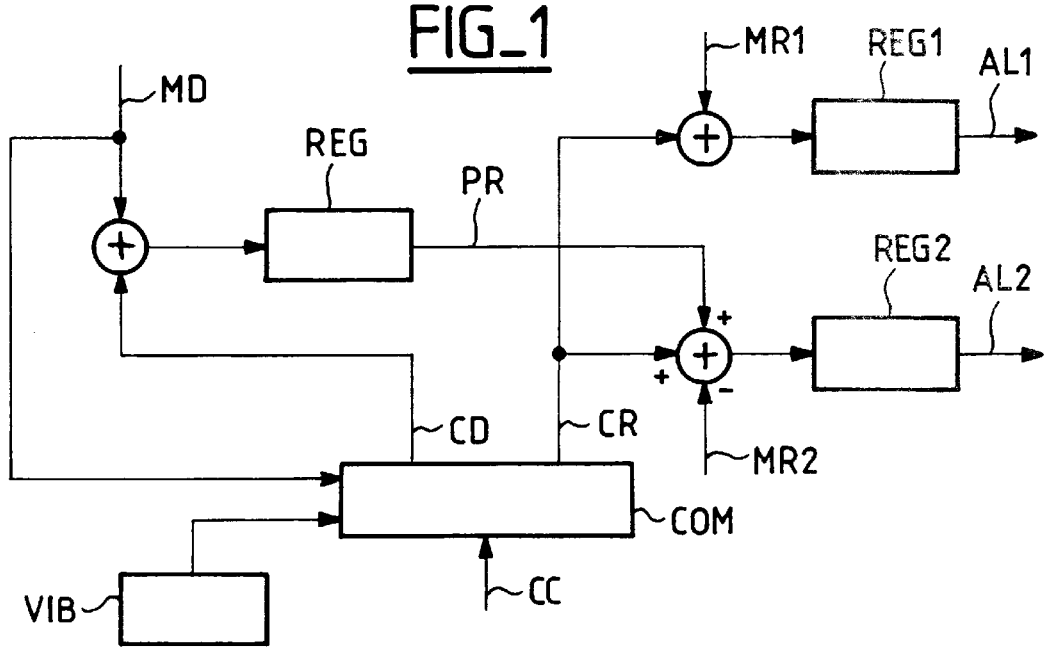
FIG_1
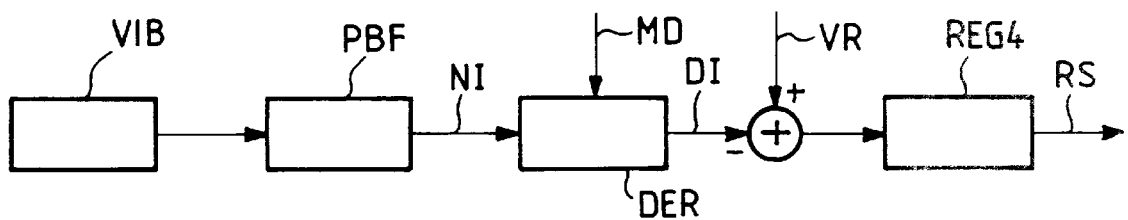
FIG_2
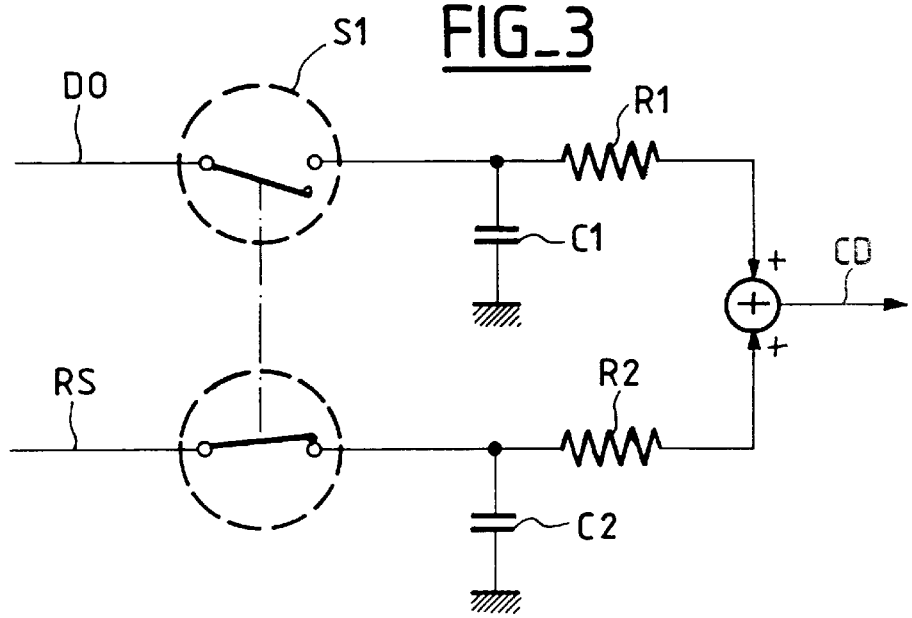
FIG_3

APPARATUS FOR REDUCING VIBRATION ON A SHIP

The present invention relates to apparatus for reducing vibration on a ship provided with two drive shafts.

BACKGROUND OF THE INVENTION

Achieving acoustic silence is an important concern in marine vessels. For passenger ships the purpose is to improve passenger comfort, whereas for scientific ships or naval vessels, silence is an operating constraint.

It is therefore appropriate to reduce the acoustic vibration generated by water being compressed against the hull because of propeller rotation. This corresponds to the case where the ship is driven by at least two drive shafts each provided with a propeller.

It is thus known to fit each of the two shafts of a ship with an angular position encoder and to use these means to regulate the speed of rotation of the shafts so that they present an angular difference which is set to a constant reference value. This reference is the result of mechanical considerations concerning the interactions between the propellers, the water, and the hull, and these considerations are subject to a certain amount of inaccuracy. In addition, the interactions depend closely on the operating conditions of the ship. Amongst these conditions, mention can be made in particular of the power developed on a drive shaft, its speed of rotation, the burden of the ship, the speed at which it is advancing, and the temperature and the salinity of the water.

As a result, calculating such a reference value is very complex. Furthermore, the fact of adopting a reference value that is constant leads necessarily to a compromise, in other words the reference value is not always optimized for the operating conditions of the ship in any given situation.

OBJECTS AND SUMMARY OF THE INVENTION

Thus, an object of the present invention is to provide apparatus for reducing vibration which is not subject to the constraints or limitations mentioned above.

According to the invention, this apparatus as fitted to a ship provided with at least two drive shafts comprises means for servo-controlling the angular difference of the two shafts to a reference value; it further comprises calibration Means for finding an optimum angular offset between the shafts which corresponds to a vibration minimum, and control means for responding to a control signal to actuate in succession said calibration means and then said servo-control means, with said optimum angular offset being fixed as the reference value.

Thus, for given operating conditions and prior to performing conventional servo-control, a search is made for an optimum angular offset that leads to minimum vibration.

An advantageous application of the invention lies with drive shafts driven by electric motors. Under such circumstances, the apparatus comprises measurement means for deriving the angular difference from parameters concerning the power supplied to the motors.

That makes it possible to avoid using position encoders on the shafts.

In a first option, the optimum angular offset is detected by ear.

In a second option, the apparatus further includes a vibration sensor for detecting the optimum angular offset.

It is then possible to provide for the apparatus to comprise a regulation system for producing a regulation signal representative of variations in vibration level, the control means fixing this regulation signal as the reference value after fixing the optimum angular offset.

Preferably, the regulation signal represents the derivative of the fundamental level of the vibrations.

Whatever the embodiment adopted, a simple solution consists in opting for manual actuation of the control signal.

In addition, it is advantageous to design the apparatus in such a manner that the control signal is actuated following a modification to the operating conditions of the ship.

In particular, this modification may concern either the speed of rotation or else the power transmitted to one of the shafts

BRIEF DESCRIPTION OF THE DRAWING

Other advantages and characteristics of the present invention will appear in greater detail on reading the following description of embodiments given by way of example and with reference to the accompanying figures, in which:

FIG. 1 is a block diagram of an embodiment of the apparatus of the invention;

FIG. 2 is a block diagram of a regulation system of the invention; and

FIG. 3 is a circuit diagram of an analog implementation suitable for implementing the regulation phase of the apparatus.

MORE DETAILED DESCRIPTION

Elements present in more than one figure are given the same single reference in all of the figures.

With reference to FIG. 1, the apparatus comprises a control circuit COM which receives various items of pertinent information and which controls the other members in the manner described below. For example, it may be a microprocessor.

A first regulator REG1 regulates the speed of rotation of a first drive shaft by producing a first power supply signal AL1 destined for the motor driving the shaft. At its input it receives the difference between a reference speed of rotation CR supplied by the control circuit COM and the speed of rotation MR1 as measured on said shaft.

A second regulator REG2 regulates the speed of rotation of the second drive shaft by producing a second power supply signal AL2 destined for the motor driving the shaft. At its input it receives the difference between firstly the sum of the rotation speed reference CR plus a relative position signal PR, and secondly the speed of rotation MR2 of the second shaft.

The relative positioning signal PR is produced by a third regulator REG3 of the proportional integral type, for example, which receives at its input the difference between an angular offset reference CD from a control circuit COM and the measured angular difference MD between the two drive shafts.

The measurement signals MR1, MR2, and MD relating to the speed of rotation of the shafts or to their angular difference can be obtained by means of position encoders disposed on the shafts.

However, in most cases, the shafts are driven by electric motors. It is then advantageous to acquire these various measurements by using power supply parameters relating to these motors, such as frequency, and stator and rotor voltage and current, or indeed control signals applied to thyristors when such components are used for powering the motors.

That is a technique which is known to the person skilled in the art and is therefore not described in greater detail below.

In a first phase for calibration, the control circuit COM responds to a control signal CC by producing a ramp as an angular offset reference CD such that the measured angular difference is progressively increased by 360°. When a vibration minimum is detected, the control circuit stores the corresponding value of the angular difference which then represents an optimum offset DO.

The vibration minimum can be detected by ear, by an experienced person.

It can also be measured by means of a vibration sensor VIB. An advantageous solution then consists in retaining as the vibration level the amplitude of the fundamental frequency of such vibration. By recording a reading of vibration level as a function of angular difference over 360°, it is then easy to find the minimum value for the vibration level and to identify the corresponding optimum offset DO.

This first stage may optionally be repeated one or more times so as to improve accuracy, with this being done by taking the average of a plurality of different levels for a given offset. Here again, this is a technique that is very well known and it is not described in greater detail.

Thereafter, in a second stage for servo-control the control circuit COM produces the value of said optimum offset DO as the angular offset reference CD. It follows that the two drive shafts are servo-controlled so that they present an angular difference equal to the optimum offset.

It will be observed that the control signal CC can be produced manually by qualified personnel, e.g. the captain. However the signal can also be produced automatically when there is a modification to certain operating conditions, for example the reference speed of rotation CR or the power supplied to the drive motor.

During the servo-control stages both shafts are thus servo-controlled in terms of angular difference to a constant value which corresponds to minimum vibration for the operating conditions present during the calibration stage. Although such servo-control provides a significant improvement over the state of the art, it can happen that operating conditions evolve during the servo-control stage so that there is no guarantee that the optimum offset acquired during the calibration stage continues to the same sometime later.

One solution to that problem would be to produce a control signal from time to time, whether manually or automatically, so as to renew the calibration stage periodically.

Nevertheless, the invention proposes a third stage, referred to as a "regulation" stage, during which the optimum offset is continuously updated by means of a regulator system.

With reference to FIG. 2, the vibration sensor VIB is followed by a filter module PBF which isolates the fundamental component of the signal output from the sensor and produces a level signal NI representative of the amplitude of the fundamental component.

A differentiation module DER is provided to differentiate the level signal NI relative to the measured angular difference MD. This consists in regulating the value of the level signal NI on a minimum value, and one of the possible methods consists in taking the derivative of the appropriate function and in regulating relative to a reference value VR equal to zero.

In a first embodiment, the differentiation module takes the time derivative dNI of the level signal NI, the time derivative dMD of the measured angular difference MD, and produces a differentiation signal DI equal to the ratio of the first and second derivatives dNI/dMD.

In a second embodiment, it is possible to adopt a discrete representation of the various variables in which i represents the time increment and, by indexing said variables on discrete time intervals i, the differentiation signal DI can be calculated by means of the following expression:

$$DI_i = \frac{NI_i - NI_{i-1}}{MD_i - MD_{i-1}}$$

Naturally, many other embodiments are available and it is not possible to show them herein exhaustively. The important point is to determine the sign of the differentiation signal DI, and simple means consist in evaluating the direction in which the measured angular difference MD varies.

A fourth regulator REG4, e.g. of the proportional type, receives at its input the difference between the reference value VR (assumed to be zero) and the differentiation signal DI to produce a regulation signal RS.

Thus, shortly after the servo-control stage, the control circuit COM begins the regulation stage during which the reference angular offset CD passes progressively from the optimum offset value DO as acquired during the calibration stage to the value of the regulation signal RS. This result can be obtained by producing as the offset reference CD a function F of the type F=a(t)×DO+b(t)×RS in which a(t) tends towards zero and b(t) tends towards a constant as t tends towards infinity. An advantageous special case consists in setting b(t)=1−a(t). This function can be implemented digitally within the control circuit.

With reference to FIG. 3, it is also possible to implement it in analog manner. In this case, first and second switches S1 and S2 are provided which are controlled synchronously so that opening of the first switch S1 coincides with closing of the second switch S2.

The first switch S1 receives firstly the optimum offset DO and is connected to first terminals of a first capacitor C1 and of a first resistor R1. The second terminal of the first capacitor C1 is connected to ground while the second terminal of the first resistor R1 is injected to an input of an adder circuit SUM.

The second switch S2 receives firstly the regulation signal RS and secondly is connected to the first terminals of a second capacitor C2 and of a second resistor R2. The second terminal of the second capacitor C2 is connected to ground while the second terminal of the second resistor R2 is injected to another input of the adder circuit SUM.

The output from the adder circuit gives the angular offset reference CD that is to be applied.

When passing from the servo-control stage to the regulation stage, the control circuit changes over the first and second switches S1 and S2 which switch respectively from closed to open and from open to closed.

The invention is not limited to the implementations described above. In particular, it is possible to replace any means by equivalent means.

What is claimed is:

1. Apparatus for reducing vibration on a ship provided with at least two drive shafts, the apparatus comprising:

servo-control means for servo-controlling an angular difference of said two shafts based on a reference value;

calibration means for finding an optimum angular offset between the shafts which corresponds to a minimum value of a vibration level of said ship; and control means for responding to a control signal to actuate in succession said calibration means and then said servo-control means, wherein said reference value is set to said optimum angular offset.

2. An apparatus according to claim 1, wherein, said shafts being driven by electric motors, the apparatus further comprises measurement means for deriving said angular difference from power supply parameters of said electric motors.

3. An apparatus according to claim 1, wherein said optimum angular offset corresponds to an audibly detected minimum value of said vibration level.

4. An apparatus according to claim 1, further comprising a vibration sensor for detecting said said vibration level.

5. An apparatus according to claim 4, further comprising a regulation system for receiving said vibration level from said vibration sensor and generating a regulation signal representative of variations in vibration level, wherein said control means sets the reference value to be equal to the regulation signal after setting the reference value to be equal to said optimum angular offset.

6. An apparatus according to claim 5, wherein said regulation signal represents the derivative of the fundamental level of the vibration level.

7. An apparatus according to claim 1, wherein said control signal is a manually actuated control signal.

8. An apparatus according to claim 1, wherein said control signal is responsive to a modification to the operating conditions of the ship.

9. An apparatus according to claim 8, wherein said modification relates either to the speed of rotation or to the power transmitted by one of said shafts.

10. Apparatus for reducing vibration on a ship provided with at least a first drive shaft and a second drive shaft, the apparatus comprising:
    a first regulation circuit for receiving a reference value and servo-controlling the angular difference of said first and second drive shafts based on said reference value;
    a vibration sensor for detecting a vibration level of the ship; and
    a control circuit for receiving the vibration level from said vibration sensor, determining an optimum angular offset between the shafts corresponding to a minimum value of the vibration level and setting said reference value to correspond to said optimum angular offset.

11. An apparatus according to claim 10, wherein said first regulation circuit comprises:
    a first regulator for regulating the speed of said first drive shaft based on a reference rotation speed signal and a measured rotation speed of said first shaft;
    a second regulator for regulating the speed of said second drive shaft based on said reference rotation speed signal, a measured rotation speed of said second shaft and a relative positioning signal; and
    a third regulator for generating said relative positioning signal based on said reference value generated by said control circuit and a measured angular difference signal representing the angular difference of said first and second shafts.

12. An apparatus according to claim 11, further comprising a second regulation circuit for receiving said vibration level from said vibration sensor and generating a regulation signal representative of variations in the vibration level, wherein said control circuit sets the reference value to be equal to the regulation signal after setting the reference value to be equal to said optimum angular offset.

13. An apparatus according to claim 12, wherein said regulation signal represents the derivative of the fundamental level of the vibration level.

14. An apparatus according to claim 12, wherein said second regulation circuit comprises:
    a filter unit for determining a fundamental component of the vibration level and generating a level signal representative of the amplitude of the fundamental component;
    a differentiation circuit for generating a differentiation signal corresponding to a ratio of a time derivative of the level signal and a time derivative of a measured angular difference signal representing the angular difference of said first and second shafts; and
    a fourth regulator for generating a regulation signal based on the difference between a reference value and the differentiation signal.

* * * * *